United States Patent
Yi et al.

(10) Patent No.: US 10,631,320 B2
(45) Date of Patent: Apr. 21, 2020

(54) METHOD AND USER EQUIPMENT DEVICE FOR TRANSMITTING UPLINK DATA

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/099,666

(22) PCT Filed: May 11, 2017

(86) PCT No.: PCT/KR2017/004883
§ 371 (c)(1),
(2) Date: Nov. 7, 2018

(87) PCT Pub. No.: WO2017/196099
PCT Pub. Date: Nov. 16, 2017

(65) Prior Publication Data
US 2019/0159229 A1    May 23, 2019

Related U.S. Application Data

(60) Provisional application No. 62/335,035, filed on May 11, 2016.

(51) Int. Cl.
*H04W 72/12* (2009.01)
*H04W 72/14* (2009.01)
(Continued)

(52) U.S. Cl.
CPC ....... *H04W 72/1268* (2013.01); *H04W 16/14* (2013.01); *H04W 28/08* (2013.01);
(Continued)

(58) Field of Classification Search
CPC ............ H04W 72/1268; H04W 72/14; H04W 72/1247; H04W 72/1289; H04W 28/08; H04W 16/14
See application file for complete search history.

(56) References Cited

U.S. PATENT DOCUMENTS

2010/0272045 A1* 10/2010 Hsu .................. H04W 72/1252
370/329
2012/0250631 A1* 10/2012 Hakola .................. H04L 5/001
370/329
(Continued)

FOREIGN PATENT DOCUMENTS

WO    2014074656    5/2014

OTHER PUBLICATIONS

PCT International Application No. PCT/KR2017/004883, Notification of Transmittal of the International Search Report and the Written Opinion of the International Searching Authority, or Declaration dated Aug. 29, 2017, 10 pages.
(Continued)

*Primary Examiner* — Jianye Wu
(74) *Attorney, Agent, or Firm* — Lee, Hong, Degerman, Kang & Waimey

(57) ABSTRACT

A user equipment (UE) may be configured with multiple logical channels (LoCHs). The multiple LoCHs may include at least one LoCH (U-LoCH) allowed to be transmitted via a unlicensed band. If the UE receives a uplink grant for a licensed band, the UE disables a priority bit rate of the U-LoCH for the uplink grant when applying a logical channel prioritization procedure.

13 Claims, 10 Drawing Sheets

(51) Int. Cl.
*H04W 28/08* (2009.01)
*H04W 16/12* (2009.01)
*H04W 16/14* (2009.01)

(52) U.S. Cl.
CPC ... *H04W 72/1247* (2013.01); *H04W 72/1289* (2013.01); *H04W 72/14* (2013.01)

(56) References Cited

U.S. PATENT DOCUMENTS

| | | | |
|---|---|---|---|
| 2013/0088983 A1 | 4/2013 | Pragada et al. | |
| 2013/0301568 A1* | 11/2013 | Park | H04W 52/365 370/329 |
| 2014/0161108 A1* | 6/2014 | Lohr | H04L 5/0092 370/336 |

OTHER PUBLICATIONS

European Patent Office Application Serial No. 17796399.8, Search Report dated Nov. 13, 2019, 10 pages.

Intel, "Uplink QoS support for LAA", 3GPP TSG RAN WG2 Meeting #93bis, R2-162469, XP051082426, Apr. 2016, 5 pages.

Huawei, et al., "QoS Control in LAA UL Operation", 3GPP TSG RAN WG2 Meeting #89bis, R2-151176, XP050936150, Apr. 2015, 4 pages.

Huawei, et al., "Considerations on Qos control and UL transmission on LAA SCell", 3GPP TSG RAN WG2 Meeting #93bis, R2-162429, XP051082105, Apr. 2016, 5 pages.

\* cited by examiner

FIG. 4
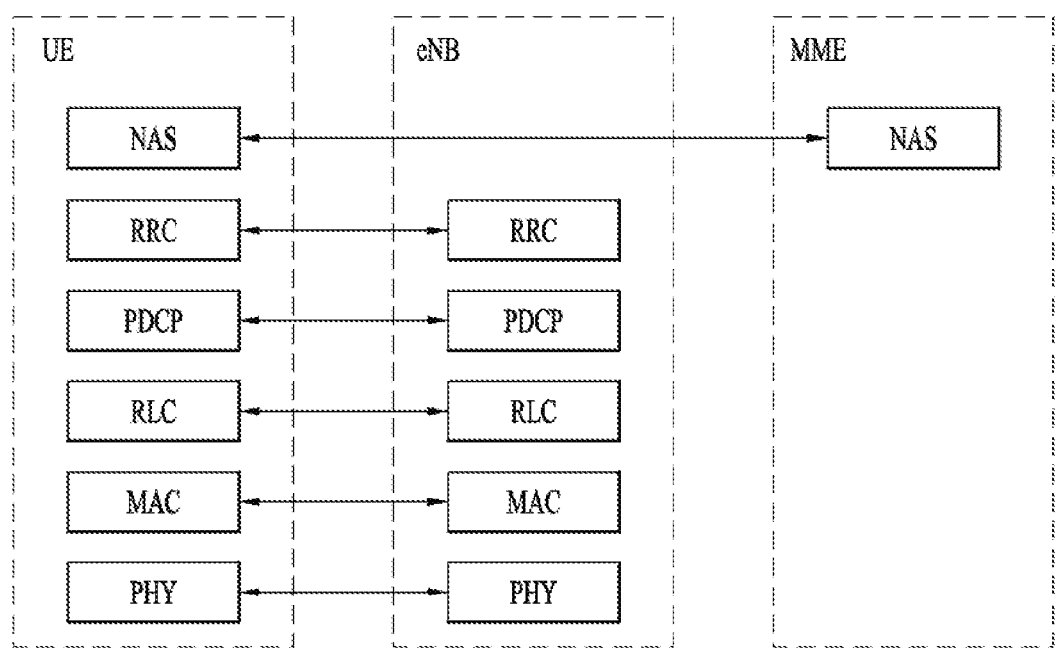
(a) Control-Plane Protocol Stack
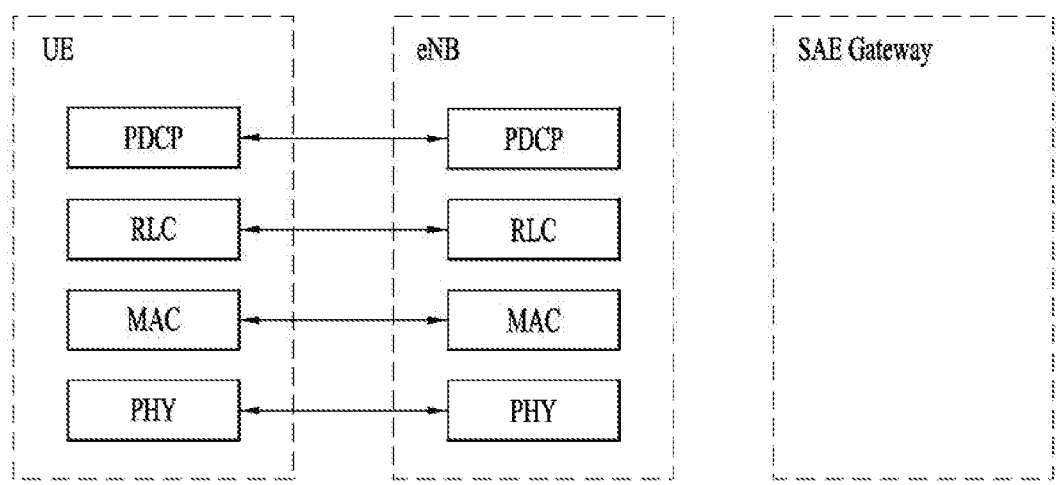
(b) User-Plane Protocol Stack

METHOD AND USER EQUIPMENT DEVICE FOR TRANSMITTING UPLINK DATA

CROSS-REFERENCE TO RELATED APPLICATIONS

This application is the National Stage filing under 35 U.S.C. 371 of International Application No. PCT/KR2017/004883, filed on May 11, 2017, which claims the benefit of U.S. Provisional Application No. 62/335,035, filed on May 11, 2016, the contents of which are all hereby incorporated by reference herein in their entirety.

TECHNICAL FIELD

The present invention relates to a wireless communication system, and more particularly, to a method and apparatus for transmitting uplink data.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology. A standard for a wireless local area network (WLAN) technology is developing as IEEE (Institute of Electrical and Electronics Engineers) 802.11 standard. IEEE 802.11a and b use an unlicensed band on 2.4 GHz or 5 GHz. IEEE 802.11b provides transmission speed of 11 Mbps and IEEE 802.11a provides transmission speed of 54 Mbps. IEEE 802.11g provides transmission speed of 54 Mbps in a manner of applying an OFDM (orthogonal frequency-division multiplexing) scheme on 2.4 GHz. IEEE 802.11n provides transmission speed of 300 Mbps to 4 spatial streams in a manner of applying a MIMO-OFDM (multiple input multiple output-OFDM) scheme. IEEE 802.11n supports a channel bandwidth as wide as 40 MHz. In this case, it is able to provide transmission speed of 600 Mbps. The aforementioned WLAN standard has been continuously enhanced and standardization of IEEE 802.11ax, which is appearing after IEEE 802.11ac standard supporting maximum 1 Gbps by using maximum 160 MHz channel bandwidth and supporting 8 spatial streams, is under discussion.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

In addition, a method of simultaneously transmitting more signals by aggregating carriers used by different systems is needed.

The technical objects that can be achieved through the present invention are not limited to what has been particularly described hereinabove and other technical objects not described herein will be more clearly understood by persons skilled in the art from the following detailed description.

Technical Solution

A user equipment (UE) may be configured with multiple logical channels (LoCHs). The multiple LoCHs may include at least one LoCH (U-LoCH) allowed to be transmitted via a unlicensed band. If the UE receives a uplink grant for a licensed band, the UE disables a priority bit rate of the U-LoCH for the uplink grant when applying a logical channel prioritization procedure.

In an aspect of the present invention, there is provided a method of transmitting, by a user equipment (UE), uplink (UL) data. The method comprises: receiving, by the UE, configuration information of multiple logical channels (LoCHs), the configuration information including a priority bit rate (PBR) for each of the multiple LoCHs and a priority value for each of the multiple LoCHs; receiving, by the UE, a UL grant; and if the UL grant is for a licensed band, disabling a PBR for a LoCH (U-LoCH) allowed to be transmitted via a unlicensed band when applying a logical channel prioritization (LCP) procedure.

In another aspect of the present invention, there is provided a user equipment for transmitting uplink (UL) data. The UE comprises a radio frequency (RF) unit, and a processor configured to control the RF unit. The processor: controls the RF unit to receive configuration information of multiple logical channels (LoCHs), the configuration information including a priority bit rate (PBR) for each of the multiple LoCHs and a priority value for each of the multiple LoCHs; controls the RF unit to receive UL grant; and if the UL grant is for a licensed band, disables a PBR for a LoCH (U-LoCH) allowed to be transmitted via a unlicensed band when applying a logical channel prioritization (LCP) procedure.

In still another aspect of the present invention, there is provided a method of transmitting, by a user equipment (UE), uplink (UL) data. The method comprises: receiving, by the UE, configuration information of a logical channel (LoCH), the configuration information including a priority bit rate (PBR) for the LoCH and a priority value for the LoCH; receiving, by the UE, a UL grant; and applying or disabling the PBR for the LoCH depending on for which cell the UL grant is transmitted, when applying a logical channel prioritization (LCP) procedure.

In a further aspect of the present invention, there is provided a user equipment for transmitting uplink (UL) data. The UE comprises: a radio frequency (RF) unit, and a processor configured to control the RF unit. The processor: controls the RF unit to receive configuration information of a logical channel (LoCH), the configuration information including a priority bit rate (PBR) for the LoCH and a priority value for the LoCH; controls the RF unit to receive a UL grant; and applies or disables the PBR for the LoCH depending on for which cell the UL grant is transmitted, when applying a logical channel prioritization (LCP) procedure.

In each aspect of the present invention, if the UL grant is for a unlicensed band, the UE may apply the LCP procedure without disabling the PBR for the U-LoCH.

In each aspect of the present invention, the UE may set the PBR for the U-LoCH to zero.

In each aspect of the present invention, the LCP procedure may comprise: allocating UL resources of the UL grant to at least one LoCH of the multiple LoCHs according to respective PBRs and priority values for the multiple LoCHs.

In each aspect of the present invention, the UE may transmit data of the at least one LoCH using the UL grant.

In each aspect of the present invention, the configuration information may include Ucell allowed information for each of the multiple LoCHs. The Ucell allowed information indicates whether data of a corresponding LoCH is allowed to be transmitted via a unlicensed band or not.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to the present invention, a carrier or access technology which is not dedicated to a LTE/LTE-A system can be used for transmitting/receiving signals of the LTE/LTE-A system while maintaining compatibility with the LTE/LTE-A system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 4 is a diagram showing a control plane and a user plane of a radio interface protocol between a UE and an E-UTRAN based on a 3GPP radio access network standard.

MODE FOR INVENTION

Figure 1:
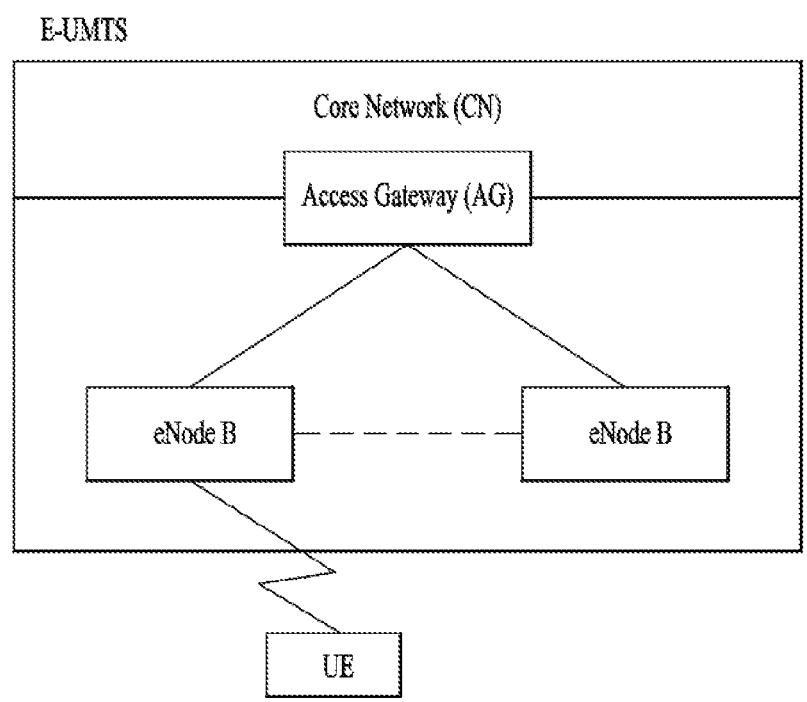
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321, 3GPP TS 36.322, 3GPP TS 36.323 and 3GPP TS 36.331 may be referenced.

Figure 2:
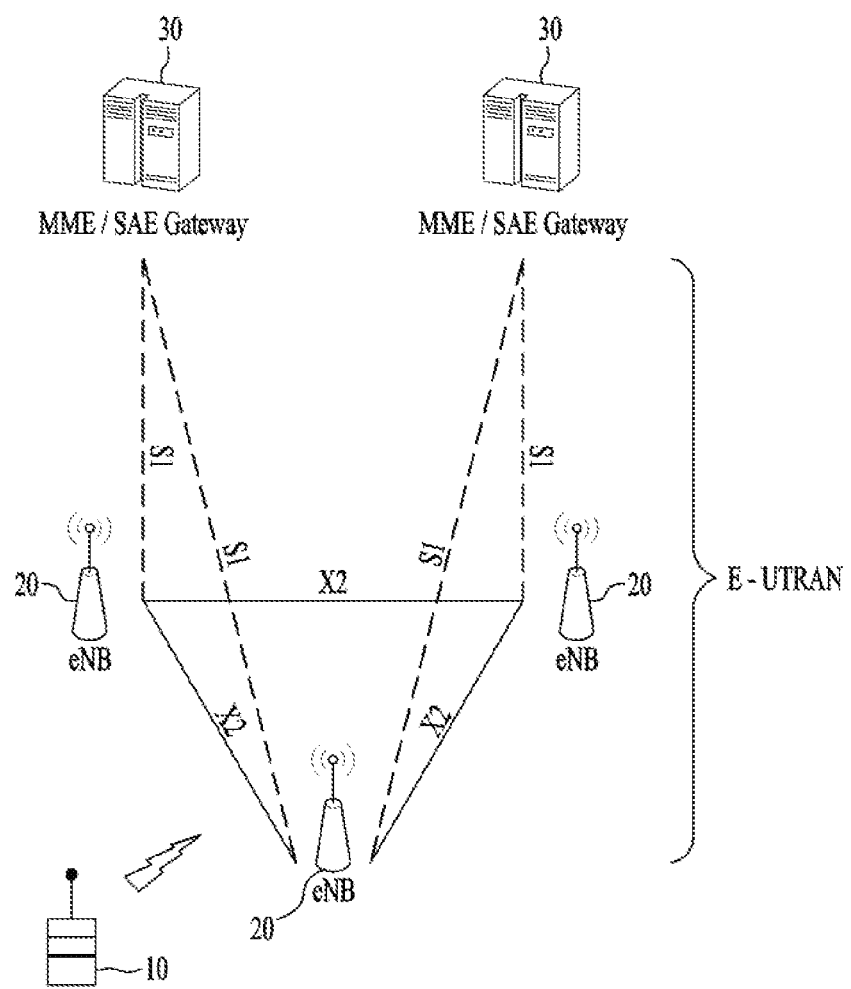
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
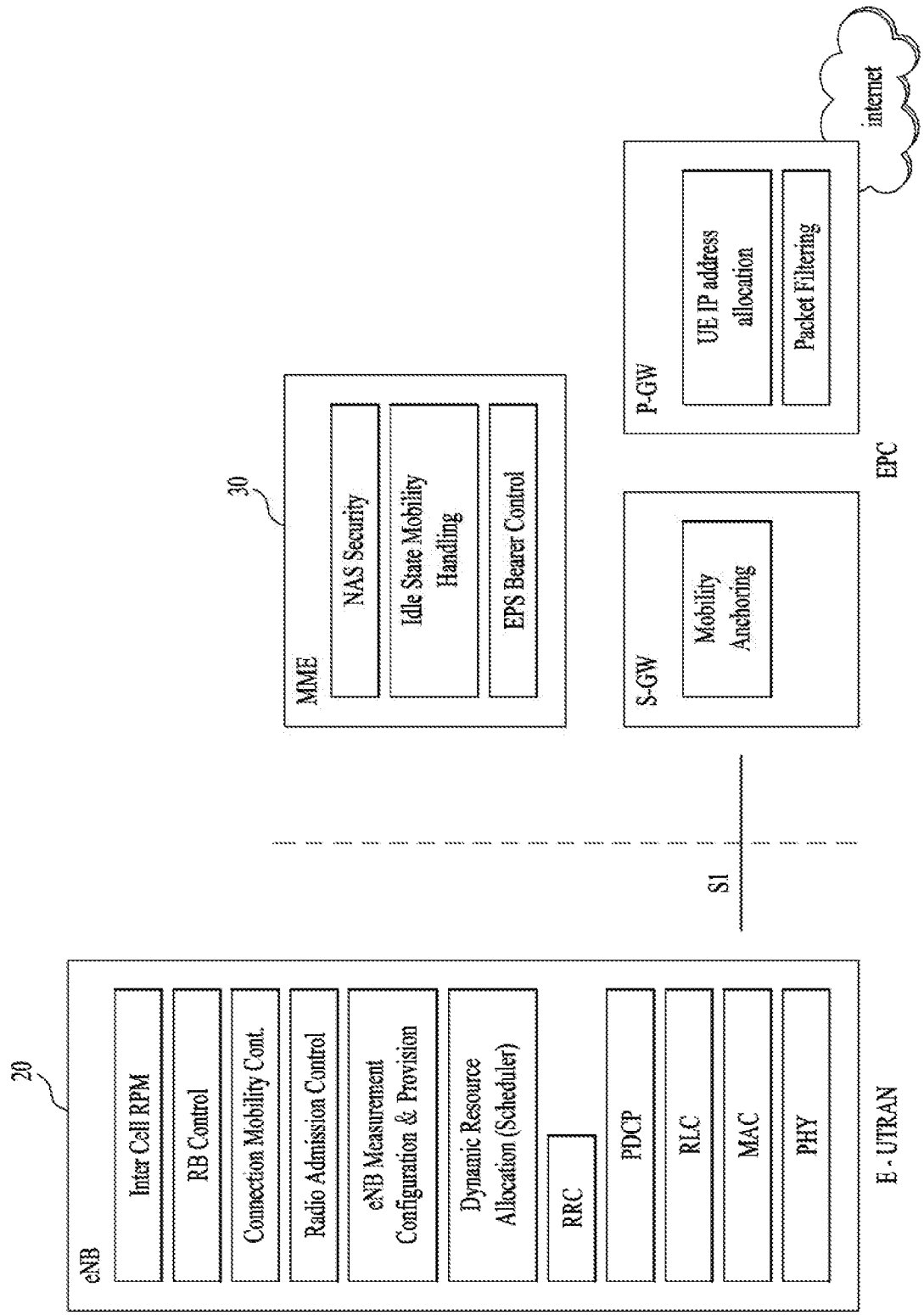
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW (P-GW) and Serving GW (S-GW) selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer (i.e. layer 1 or L1) provides an information transfer service to a higher layer using a physical channel. The PHY layer is connected to a medium access control (MAC) layer located on the higher layer via a transport channel Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer (i.e. layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

Radio bearers are roughly classified into (user) data radio bearers (DRBs) and signaling radio bearers (SRBs). SRBs are defined as radio bearers (RBs) that are used only for the transmission of RRC and NAS messages. For example, the following SRBs are defined:
  SRB0 is for RRC messages using the common control channel (CCCH) logical channel;
  SRB1 is for RRC messages (which may include a piggybacked NAS message) as well as for NAS messages prior to the establishment of SRB2, using DCCH logical channel;
  For narrowband internet of things (NB-IoT), SRB1b is is for RRC messages (which may include a piggybacked NAS message) as well as for NAS messages prior to the activation of security, all using DCCH logical channel;
  SRB2 is for RRC messages which include logged measurement information as well as for NAS messages, using DCCH logical channel. SRB2 has a lower-priority than SRB1 and is always configured by E-UTRAN after security activation.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
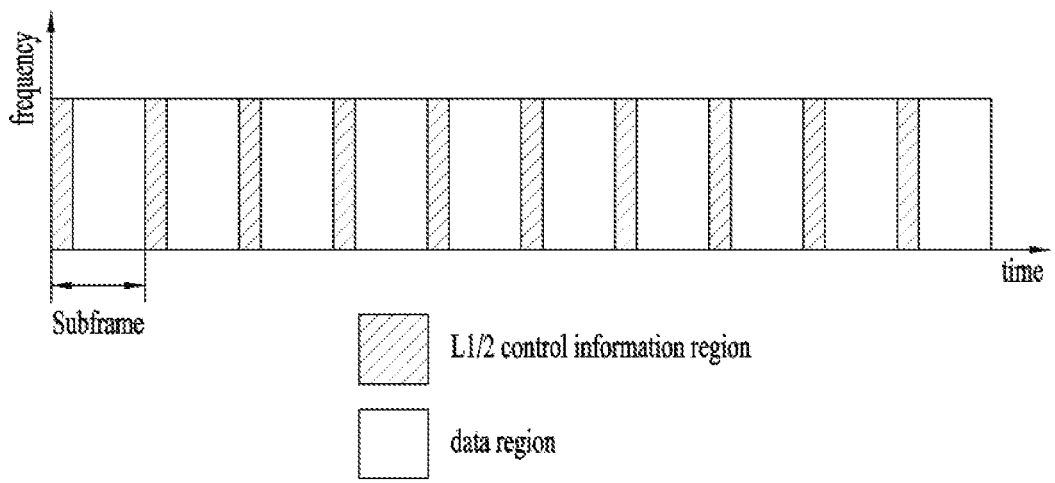
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes.

In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

The MAC layer supports the following functions: mapping between logical channels and transport channels; multiplexing of MAC SDUs from one or different logical channels onto transport blocks (TB) to be delivered to the physical layer on transport channels; demultiplexing of MAC SDUs from one or different logical channels from transport blocks (TB) delivered from the physical layer on transport channels; scheduling information reporting (e.g. scheduling request, buffer status reporting); error correction through HARQ; priority handling between UEs by means of dynamic scheduling; priority handling between logical channels of one MAC entity; Logical Channel Prioritization (LCP); transport format selection; and radio resource selection for SL.

The logical channel prioritization (LCP) procedure is applied when a new transmission is performed. RRC controls the scheduling of uplink data by signaling for each logical channel: priority where an increasing priority value indicates a lower priority level, prioritisedBitRate which sets the prioritized bit rate (PBR), bucketSizeDuration which sets the bucket size duration (BSD). The eNB may provide a UE with the information element (IE) LogicalChannelConfig, which is used to configure logical channel parameters, through RRC signaling. The parameter bucketSizeDuration for a logical channel has a value in milliseconds, and value ms50 corresponds to 50 ms, ms 100 corresponds to 10 ms and so on. The parameter prioritisedBitRate for a logical channel has a value in kilobytes/second, Value kBps0 corresponds to 0 kB/second, kBps8 corresponds to 8 kB/second, kBps16 corresponds to 16 kB/second and so on. The parameter priority for a logical channel has an integer value.

The MAC entity shall maintain a variable Bj for each logical channel j. Bj shall be initialized to zero when the related logical channel is established, and incremented by the product PBR*TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR*BSD, where PBR and BSD are configured by upper layers.

The MAC entity shall perform the following LCP procedure when a new transmission is performed:

The MAC entity shall allocate resources to the logical channels in the following steps:
Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);
Step 2: the MAC entity shall decrement Bj by the total size of MAC SDUs served to logical channel j in Step 1 (NOTE: The value of Bj can be negative);
Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:
the UE should not segment an RLC SDU (or partially transmitted SDU or retransmitted RLC PDU) if the whole SDU (or partially transmitted SDU or retransmitted RLC PDU) fits into the remaining resources of the associated MAC entity;
if the UE segments an RLC SDU from the logical channel, it shall maximize the size of the segment to fill the grant of the associated MAC entity as much as possible;
the UE should maximize the transmission of data;
if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted).

The MAC entity shall not transmit data for a logical channel corresponding to a radio bearer that is suspended (the conditions for when a radio bearer is considered suspended are defined in 3GPP 36.331).

For the LCP procedure, the MAC entity shall take into account the following relative priority in decreasing order:
MAC control element for C-RNTI or data from UL-CCCH;

MAC control element for data volume and power headroom report (DPR);
MAC control element for SPS confirmation;
MAC control element for BSR, with exception of BSR included for padding;
MAC control element for PHR, Extended PHR, or Dual Connectivity PHR;
MAC control element for Sidelink BSR, with exception of Sidelink BSR included for padding;
data from any Logical Channel, except data from UL-CCCH;
MAC control element for Recommended bit rate query;
MAC control element for BSR included for padding;
MAC control element for Sidelink BSR included for padding.

When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

Figure 6:
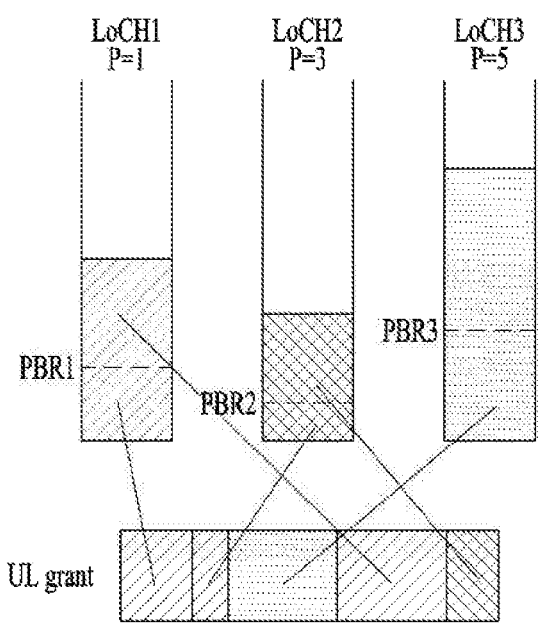
FIG. 6 illustrates allocating uplink resources to logical channels according to a logical channel prioritization (LCP) procedure in the current LTE/LTE-A system.

FIG. 6 illustrates allocating uplink resources to logical channels according to a logical channel prioritization (LCP) procedure in the current LTE/LTE-A system.

In FIG. 6, "P" denotes a priority value for a logical channel (LoCH). Referring to FIG. 6, for example, a priority value for LoCH1, a priority value for LoCH2 and a priority value for LoCH3 are 1, 3 and 5, respectively. LoCH1, LoCH2 and LoCH3 are allocated resources of the UL grant in a decreasing priority order according to priority bit rate 1 (PBR1), priority bit rate 2 (PBR2) and priority bit rate (PBR3), respectively. In other words, LoCH1 of the lowest priority value is allocated resource of the UL grant first as much as the amount of PBR1, then LoCH2 of the second lowest priority value is allocated resource of the UL grant as much as the amount of PBR2, and then LoCH3 of the highest priority value is allocated resource of the U grant as much as the amount of PBR3. The remaining resources of the UL grant, excluding resources corresponding to those of PBR1, PBR2 and PBR3, are then allocated to LoCH1, LoCH2 and LoCH3 in an decreasing priority order.

As more communication devices demand larger communication capacity, efficient use of a limited frequency band in a future wireless communication system becomes increasingly important. Even in a cellular communication system such as a 3GPP LTE/LTE-A system, a method of using, for traffic offloading, an unlicensed band such as a band of 2.4 GHz used by a legacy Wi-Fi system or an unlicensed band such as a band of 5 GHz, which is newly in the spotlight, is under consideration. There are two approaches using the unlicensed band. One is transmitting/receiving data on an unlicensed band using the LTE technology, and the other one is transmitting/receiving data by binding different radio technologies (e.g., LTE and WLAN).

Figure 7:
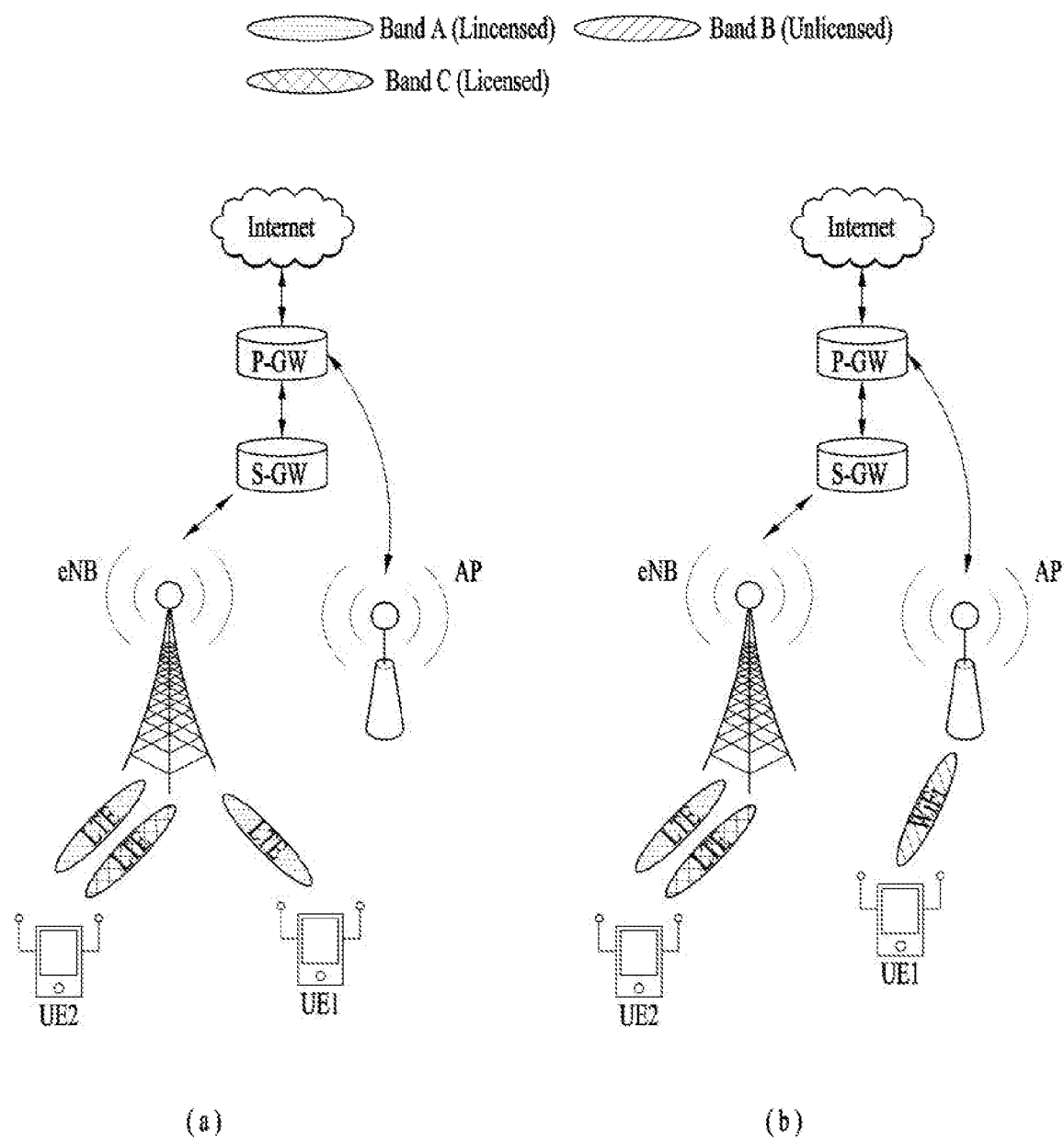
FIG. 7 illustrates the flow of (downlink/uplink) signals between a UE and a network node(s) in a conventional system.

FIG. 7 illustrates the flow of (downlink/uplink) signals between a UE and a network node(s) in a conventional system.

In the case of downlink signaling, the P-GW sends the signal transmitted with the LTE technology to the S-GW/eNB and sends the signal transmitted with the WiFi technology (without passing through the S-GW and any eNB) to the WiFi access point (AP). The UE receives signals for the UE on one or more licensed bands using the LTE technology, or receives signals for the UE on a unlicensed band using the WiFi technology.

In case of uplink signaling, signals using the LTE technology are transferred to an P-GW via an eNB and an S-GW on the licensed band, and signals using the WiFi technology are transferred on the unlicensed band (without going through an eNB and an S-GW) to the P-GW.

Figure 8:
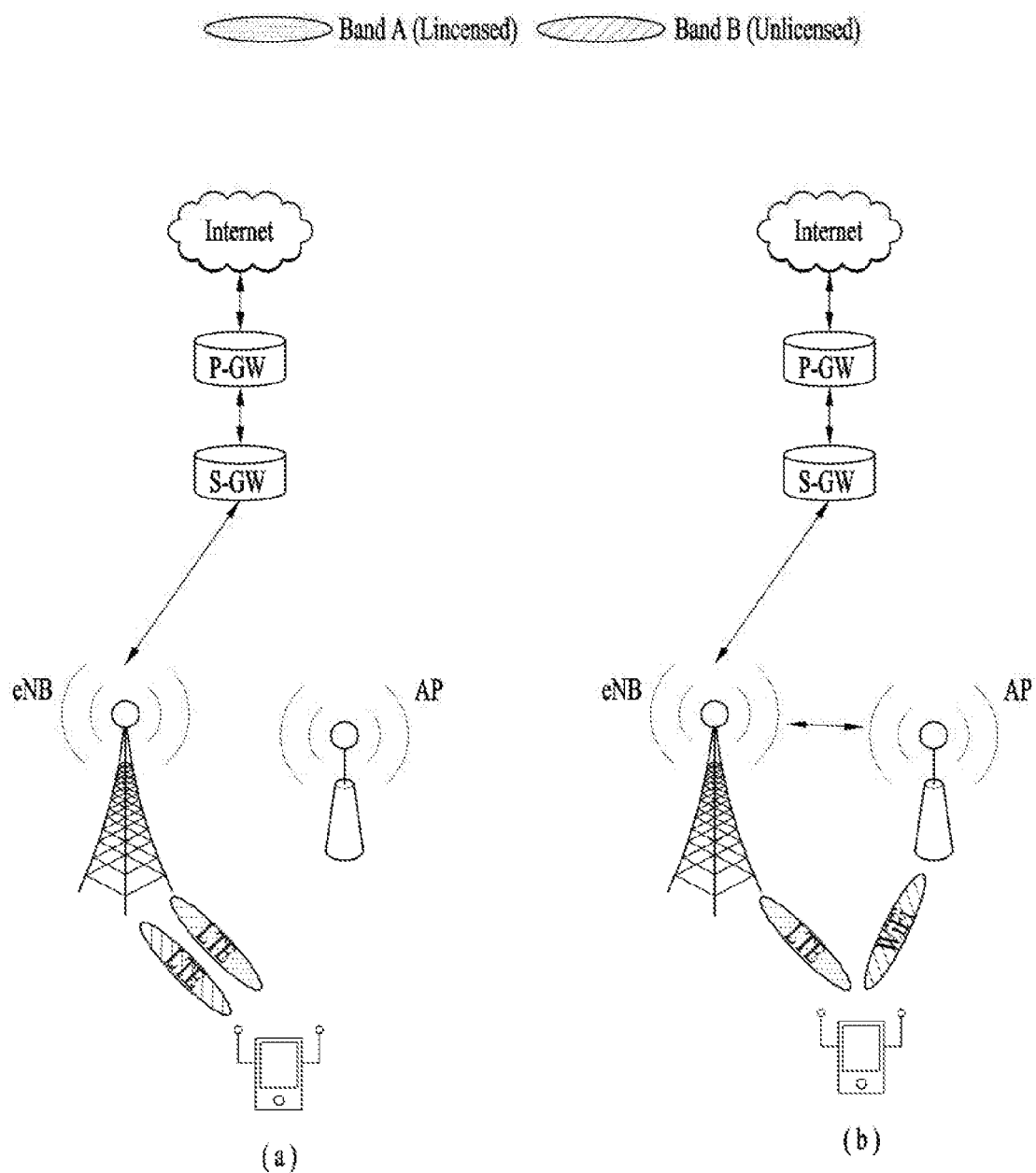
FIG. 8 illustrates the flow of (downlink/uplink) signals between a UE and a network node(s) in an enhanced wireless communication system.

FIG. 8 illustrates the flow of (downlink/uplink) signals between a UE and a network node(s) in an enhanced wireless communication system. In particular, FIG. 8(*a*) is shown to illustrate the concept of a licensed assisted access (LAA), and FIG. 8(*b*) is shown to illustrate the concept of LWA (LTE-WLAN aggregation).

In the current WiFi system, an unlicensed band that is not dedicated to a specific operator is used for communication. In such an unlicensed band, any wireless technology can be used if it is based on a certain standard, for example, adopting a technique that causes no interference or minimizes interference to the wireless channel, and uses less than a certain output power. Therefore, there is a move to apply the technology currently used in cellular networks to the unlicensed band, which is called LAA. In order to increase the user's satisfaction by providing services even in the unlicensed band as the number of users using mobile data explosively increases compared to the frequencies (i.e., the licensed band(s)) currently held by each wireless communication service provider. The introduction of LAA into LTE systems is being considered. According to the LAA, the LTE radio frequency can be extended to a frequency band not specified by 3GPP, i.e., an unlicensed band. The WLAN band can be a major target band for the application of the LAA. Referring to FIG. 8(*a*), when a band A, which is a licensed band for a UE, and a band B, which is an unlicensed band, are aggregated, the eNB may transmit a downlink signal on the band A or on the band B to the UE using the LTE technology. Likewise, when a band A, which is a licensed band and a band B, which is an unlicensed band for the UE, are aggregated, the uplink signal transmitted to the network by the UE is transmitted on the band A or on the band B from the UE to the eNB (or to a remote radio header (RRH)/remote radio unit (RRU) of the eNB) using the LTE technology.

On the other hand, in the existing LTOE system, uplink/downlink communication is performed between the UE and the network node using only LTE technology on the plurality of frequency bands even if a plurality of frequency bands are aggregated for communication with the UE. In other words, the LTE link was the only communication link the UE could use at different frequencies at the same time. Another way to reduce congestion on the licensed band is to use LTE and WiFi technologies at different frequencies simultaneously to communicate between the UE and the network node. This technique is called LWA. According to the LWA, a WLAN radio spectrum and a WLAN AP are used for communication with the UE together with the LTE radio spectrum and LTE nodes (eNB, RRH, RRU, etc.). Referring to FIG. 8(*b*), the eNB may transmit the downlink signal for the UE directly to the UE using the LTE technology on the band A, which is a license band configured for the UE, or may transmit the downlink signal to the AP. The eNB may send LTE data to the AP and control the AP. The AP may transmit the downlink signal for the UE to the UE using the WiFi technology on the band B, which is an unlicensed band, under the control of the eNB. Similarly, when the band A and the band B are configured in the UE, the UE may transmit the uplink signal directly to the eNB using the LTE technology on the band A, or to the AP using the WiFi technology on the band B. The AP forwards the uplink signal from the UE to the eNB controlling the AP.

Recently LTE-WLAN aggregation (LWA) operation has been introduced in the LTE/LTE-A system. E-UTRAN supports LWA operation whereby a UE in RRC_CONNECTED is configured by the eNB to utilize radio resources of LTE and WLAN. Two scenarios are supported depending on the backhaul connection between LTE and WLAN:

non-collocated LWA scenario for a non-ideal backhaul;
collocated LWA scenario for an ideal/internal backhaul.

Figure 9:
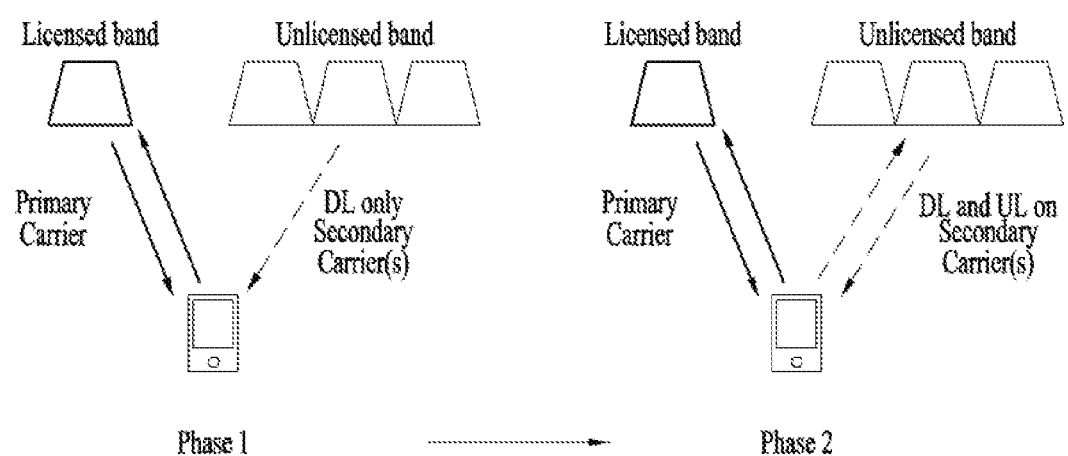
FIG. 9 illustrates an example of the licensed assisted access (LAA) framework.

FIG. 9 illustrates an example of the licensed assisted access (LAA) framework.

It has been agreed that the LTE carrier aggregation framework is reused as the baseline for LAA, and that the unlicensed carrier can only be configured as SCell. In LAA, the configured set of serving cells for a UE always includes at least one SCell operating in the unlicensed spectrum, also called LAA SCell. Unless otherwise specified, LAA SCells act as regular SCells. The SCell over the unlicensed spectrum may be downlink only or bi-directional, as depicted in FIG. 9. LAA may only applies to the operator deployed small cells. Coexistence and fair sharing with other technologies is an essential requirement for LAA in all regions.

Figure 10:
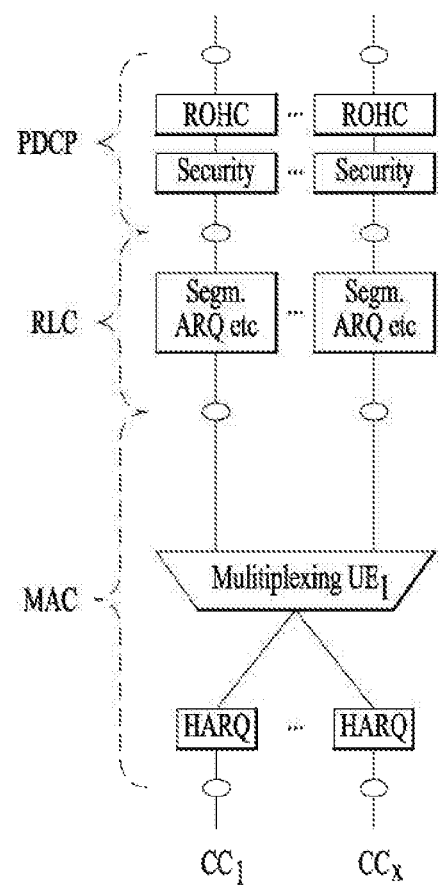
FIG. 10 illustrate the protocol architecture in carrier aggregation.

FIG. 10 illustrate the protocol architecture in carrier aggregation.

QoS supporting is implemented using radio bearers in air interface. As shown in FIG. 10, in current carrier aggregation, a radio bearer can be transmitted/received on any serving cell, and there is no special handling for QoS since there is no fundamental difference on the radio environments on all serving cells.

The radio environment in unlicensed spectrum is quite different compared with that on licensed spectrum (current LTE systems). In unlicensed spectrum, there could be various sources for interference which is outside the control of the operator: other RATs (e.g. WiFi) or LAA-capable eNB/UEs of other operators etc. In the extreme case, the unlicensed carrier might be switched off due to very strong interference. In addition, listen before talk (LBT) and DTX should be supported to meet regulatory requirements. The LBT is a mechanism by which an equipment applies clear channel assessment (CCA) before using the channel. This could impact QoS of some bearers, e.g. latency requirements might not be satisfied. Such bearers could be voice, real time gaming, or SRB. On the other hand, it is expected that there would be no impact on QoS of services like best-effort service when using LAA.

Consider a bearer carried over RLC unacknowledged mode (UM). Whenever there is an UL grant in one of the serving cells, UE applies logical channel prioritization to decide how to utilize the UL grant. When doing so, UE does not distinguish between which carrier it receives UL grant. It is possible that UE transmits data of a delay sensitive service on unlicensed spectrum, and some packets could be lost due to the unstable radio conditions or more latency is expected to successfully complete HARQ operation. Therefore, the delay requirement might not be satisfied due to unstable radio condition in unlicensed spectrum.

For UL, one simple approach for solving the QoS issue is to modify logical channel prioritization procedure (LCP) so that UE only permits logical channels when certain carriers are scheduled. For example, SRB transmission can be allowed when licensed carriers are scheduled.

Figure 11:
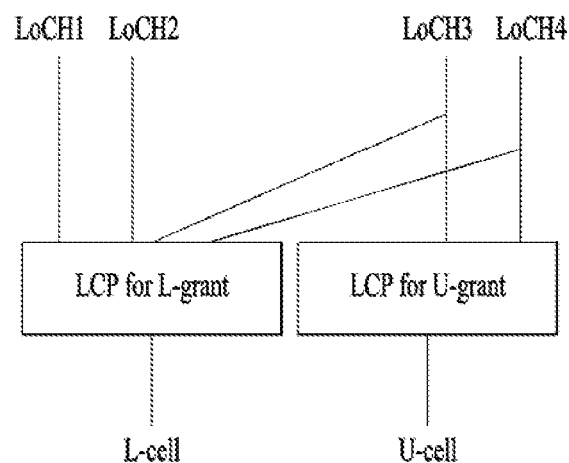
FIG. 11 illustrates an example of the logical channel prioritization (LCP) procedure in LAA.

FIG. 11 illustrates an example of the logical channel prioritization (LCP) procedure in LAA.

For the QoS control in LAA UL, whether the UL traffic can be offloaded to LAA SCells or whether the UL traffic may only be served by licensed carriers may be configured per bearer or per logical channel. For example, for a UE, an eNB may transmit information indicating whether the data of a logical channel is allowed to be transmitted via UL of LAA SCells. In this case, data of some bearers or logical channel(s) can only be transferred via licensed cell, and data of other bearer(s) or logical channel(s) can be transferred via both licensed and unlicensed cells. This method has impacts on logical channel prioritization (LCP) procedure because data from certain logical channels are considered only for licensed cell grant (L-grant) and data from other logical channels are considered for both licensed cell grant (L-grant) and unlicensed cell grant (U-grant). Hereinafter, it is proposed how to apply LCP procedure in the licensed assisted access (LAA). In the following description, logical channel(s) mapped to both licensed and unlicensed cells are referred to as U-LoCH(s), and logical channel(s) mapped to licensed cell(s) only are referred to as L-LoCH. In other words, U-LoCH may be transmitted through a licensed cell or through a unlicensed cell, while L-LoCH can be transmitted through a licensed cell only. In the following description, a UL grant for licensed cell(s) is referred to as L-grant, and a UL grant for unlicensed cell(s) is referred to as U-grant.

* Proposal 1

Referring to FIG. 11, a UE can receive, from an eNB, information indicating that some logical channels (LoCH3 and LoCH4) are mapped to both licensed cell(s) and unlicensed cell(s) while other logical channels (LoCH1 and LoCH2) are mapped to only licensed cell(s). For example, LoCH configuration information provided to UE may include Ucell allowed information for each of multiple LoCHs, where the Ucell allowed information indicating whether data of a corresponding LoCH is allowed to be transmitted via a unlicensed band or not.

Then, the UE can assume that LoCH3 and LoCH4 are mapped to both licensed cell(s) and unlicensed cell(s) while LoCH1 and LoCH2 are mapped to only licensed cell(s).

The LCP procedure should be applied to different logical channels depending on the UL grant, as shown in FIG. 11. In other words, the present invention proposes that the LCP procedure be applied to different logical channels depending on for which cell the UL grant is allocated. For example, for UL grant for licensed cell(s), the UE performs the LCP procedure for all logical channels, while for UL grant for unlicensed cells, the UE performs the LCP procedure only for logical channels that are allowed to be offloaded to unlicensed cell(s).

* Proposal 2

Proposal 1 can be easily implemented to the MAC specification with simple text saying that "the UE shall perform LCP procedure for the indicated set of logical channels". However, according to the current MAC specification, there are some issues when the UE receives both L-grant and U-grant allocated for the same TTI. For example, the current MAC specification defines the followings:

"When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed."

Namely, in the current MAC specification, it is up to UE implement how to handle the case when parallel UL grants in different cells are received. In the current MAC specification, if multiple grants for the same TTI are allocated, the UE is allowed to process them sequentially (i.e. serial processing) or sum them up all together and apply LCP once (i.e. joint processing). However, the joint processing cannot be applied to the case where a U-grant and a L-grant are allocated for the same TTI. It is because the logical channels considered for each grant are different, and thus the LCP should be applied to them independently.

Accordingly, the present invention proposes that joint processing of UL grants in one TTI be allowed only when the UL grants serve the same logical channels.

* Proposal 3

With Proposal 2, the L-grant and the U-grant allocated in the same TTI are processed independently (i.e. serial processing) as the logical channels they serve are different. However, even with serial processing, there may be some issues depending on which grant being processed first. For example, if L-grant is processed first, less UL resource is allocated to higher priority logical channel due to the allocation of some UL resource to PBR of lower priority logical channels. As a solution, it may be considered to process U-grant first if L-grant and U-grant are allocated in the same TTI. But, this restriction may not be needed. The PBR guarantees minimum bit rate of each logical channel, and as long as PBR amount of resource is allocated, there should be no critical problem for a logical channel even if it has a higher priority. The UL resource allocated more than PBR could help improving the QoS of the logical channel, but it is not really essential.

Accordingly, the present invention proposes if UL grant for licensed cells and UL grant for unlicensed cells are allocated in the same TTI, it is left up to UE implementation which UL grant shall be processed first.

* Proposal 4

Proposal 4 applies or disables a PBR of a LoCH according to for which cell the UL grant is transmitted, when applying the LCP procedure. For example, to minimize the use of licensed cell for U-LoCHs, it might be considered to disable PBR (e.g. set PBR to 0) of U-LoCH for the L-grant. In other words, to minimize the use of licensed cell for logical channels that are allowed to be offloaded to unlicensed cells, the present invention proposes to disable PBR (e.g. set PBR to 0) of logical channels for the UL grant for licensed cell. In Proposal 3, the PBR of U-LoCH is enforced only for the U-grant. When the L-grant is received, the UL resource of L-grant is allocated to U-LoCH only after the UL resource is taken up by all available data of L-LoCHs. Accordingly, transmission opportunity of L-LoCH(s) is guaranteed as far as possible.

For example, if a UE is configured with U-LoCH(s) and L-LoCH(s) and receives an L-grant, the UE disables PBR of the U-LoCH(s) for the L-grant and then performs the LCP procedure for the L-grant. Referring to FIG. 11, the UE disables PBR of LoCH3 and PBR of LoCH4, and then allocates the resources of the L-grant to LoCH1 and LoCH2 in a decreasing priority order as the amount of PBR of LoCH1 and PBR of LoCH2. If the UE is configured with the priority order of LoCH1>LoCH3>LoCH2>LoCH4, the UE allocates resources of the L-grant for the PBR of LoCH1 first, and then allocates resources of the L-grant for the PBR of LoCH2. In this example, the UE does not allocate resources of the L-grant for the PBR of LoCH3 and the PBR of LoCH4 since the UE disables the PBR of LoCH3 and the PBR of LoCH4. Then the UE allocates the remaining resources of the L-grant in the decreasing priority order, i.e. in the order of LoCH1, LoCH3, LoCH2 and LoCH4.

Proposal 1, Proposal 2, Proposal 3 or Proposal 4 may applied independently. Alternately, some of Proposal 1, Proposal 2, Proposal 3 and Proposal 4 may be applied together.

Figure 12:
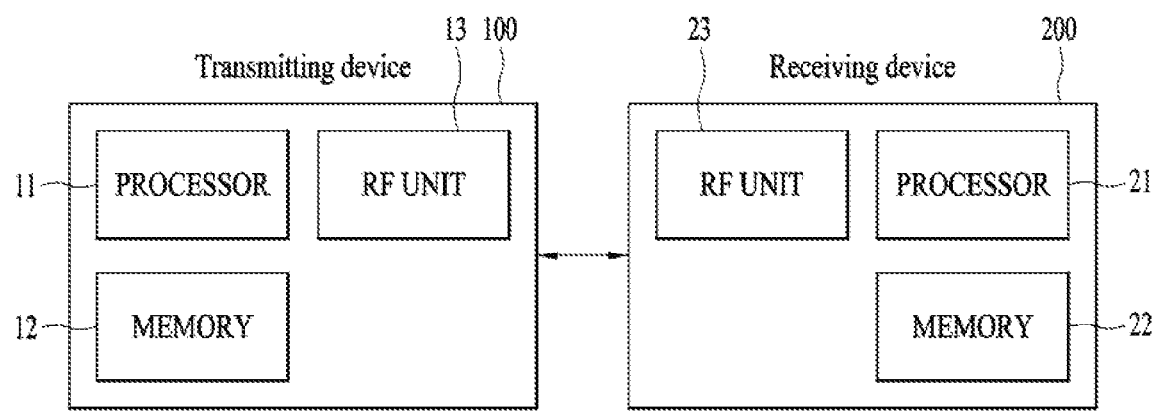
FIG. 12 is a block diagram illustrating elements of a transmitting device 100 and a receiving device 200 for implementing the present invention.

FIG. 12 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The UE RF unit receives configuration information of multiple logical channels (LoCHs), the configuration information including a priority bit rate (PBR) for each of the multiple LoCHs and a priority value for each of the multiple LoCHs. In other words, the UE can be configured with multiple LoCHs. If the UE RF unit receives a UL grant, the UE processor can apply the logical channel prioritization (LCP) procedure to the UL grant based on the PRBs for the multiple LoCHs and the priority values for the multiple LoCHs.

The UE processor may perform the LCP procedure according to Proposal 1, Proposal 2, Proposal 3 and/or Proposal 4. For example, according to Proposal 4, if the UL grant is for a licensed band, the UE processor disables a PBR for a LoCH (U-LoCH) allowed to be transmitted via a unlicensed band when applying the LCP procedure. If the UL grant is for a unlicensed band, the UE processor applies the LCP procedure without disabling the PBR for the U-LoCH. The UE processor may disable the PBR for the U-LoCH by setting the PBR for the U-LoCH to zero. The UE processor may control the UE RF unit to transmit data of the at least one LoCH using the UL grant.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method for transmitting, by a user equipment (UE), uplink (UL) data, the method comprising:
   receiving, by the UE, configuration information on multiple logical channels (LoCHs), the configuration information including a priority bit rate (PBR) for each of the multiple LoCHs and a priority value for each of the multiple LoCHs;
   receiving, by the UE, a UL grant; and
   when the UL grant is for a licensed band, disabling the PBR for a LoCH (U-LoCH) allowed to be transmitted via a unlicensed band when applying a logical channel prioritization (LCP) procedure.

2. The method according to claim 1,
   when the UL grant is for a unlicensed band, applying the LCP procedure without disabling the PBR for the U-LoCH.

3. The method according to claim 1,
   wherein disabling the PBR for the U-LoCH comprises:
   setting the PBR for the U-LoCH to zero.

4. The method according to claim 1,
   wherein the LCP procedure comprises:
   allocating, by the UE, UL resources of the UL grant to at least one LoCH of the multiple LoCHs according to respective PBRs and priority values for the multiple LoCHs.

5. The method according to claim 4, further comprising:
   transmitting, by the UE, data of the at least one LoCH using the UL grant.

6. The method according to claim 1,
   wherein the configuration information includes Ucell allowed information for each of the multiple LoCHs, and
   wherein the Ucell allowed information informs whether data of a corresponding LoCH is allowed to be transmitted via a unlicensed band or not.

7. A user equipment (UE) for transmitting uplink (UL) data, the UE comprising:
   a radio frequency (RF) module, and
   a processor configured to control the RF module, the processor that:
   controls the RF module to receive configuration information on multiple logical channels (LoCHs), the configuration information including a priority bit rate (PBR) for each of the multiple LoCHs and a priority value for each of the multiple LoCHs;
   controls the RF module to receive UL grant; and
   when the UL grant is for a licensed band, disables a PBR for a LoCH (U-LoCH) allowed to be transmitted via a unlicensed band when applying a logical channel prioritization (LCP) procedure.

8. The UE according to claim 7,
wherein, when the UL grant is for a unlicensed band, the processor applies the LCP procedure without disabling the PBR for the U-LoCH.

9. The UE according to claim 7,
wherein the processor disables the PBR for the U-LoCH by setting the PBR for the U-LoCH to zero.

10. The UE according to claim 7,
wherein the processor allocates UL resources of the UL grant to at least one LoCH of the multiple LoCHs according to respective PBRs and priority values for the multiple LoCHs when applying the LCP procedure.

11. The UE according to claim 10,
wherein the processor controls the RF module to transmit data of the at least one LoCH using the UL grant.

12. The UE according to claim 7,
wherein the configuration information includes Ucell allowed information for each of the multiple LoCHs, and
wherein the Ucell allowed information informs whether data of a corresponding LoCH is allowed to be transmitted via a unlicensed band or not.

13. A user equipment (UE) for transmitting uplink (UL) data, the UE comprising:
a radio frequency (RF) module, and
a processor configured to control the RF module, the processor that:
controls the RF module to receive configuration information on a logical channel (LoCH), the configuration information including a priority bit rate (PBR) for the LoCH and a priority value for the LoCH;
controls the RF module to receive a UL grant; and
applies or disables the PBR for the LoCH depending on for which cell the UL grant is transmitted, when applying a logical channel prioritization (LCP) procedure.

* * * * *